(No Model.) 6 Sheets—Sheet 1.
J. M. BROWNING.
MAGAZINE FIREARM.
No. 577,281. Patented Feb. 16, 1897.
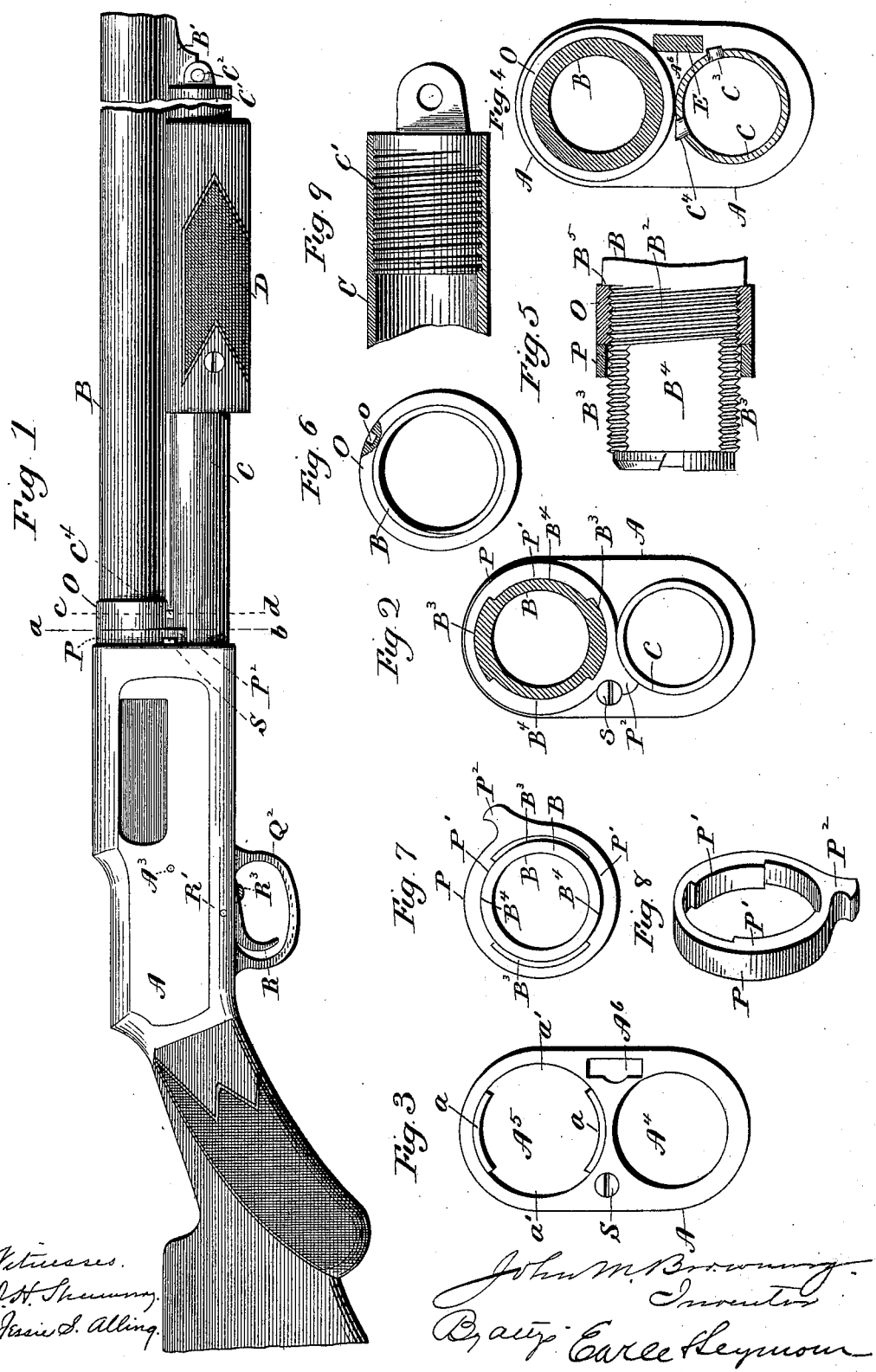

(No Model.)  J. M. BROWNING.  6 Sheets—Sheet 2.
MAGAZINE FIREARM.
No. 577,281.  Patented Feb. 16, 1897.
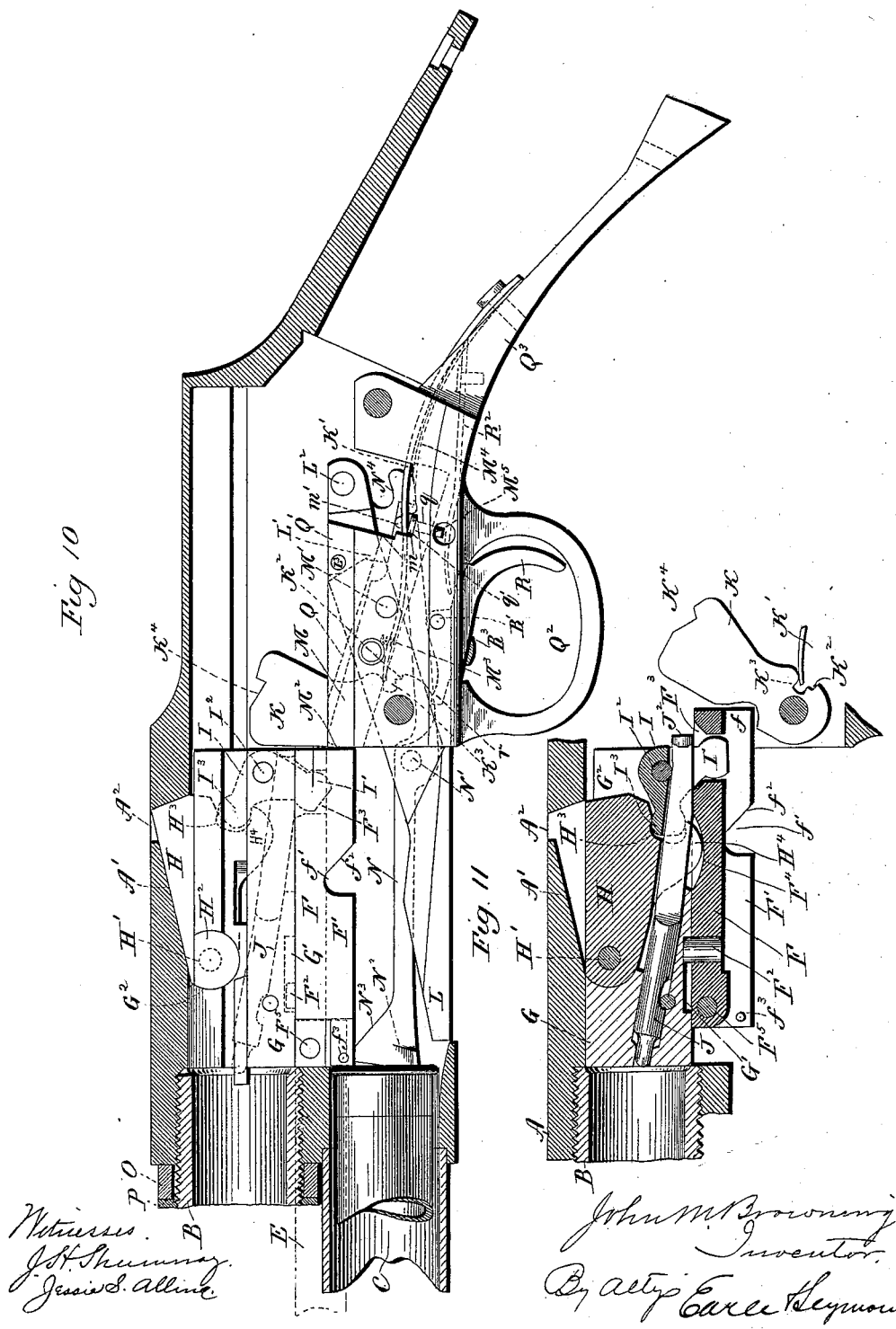

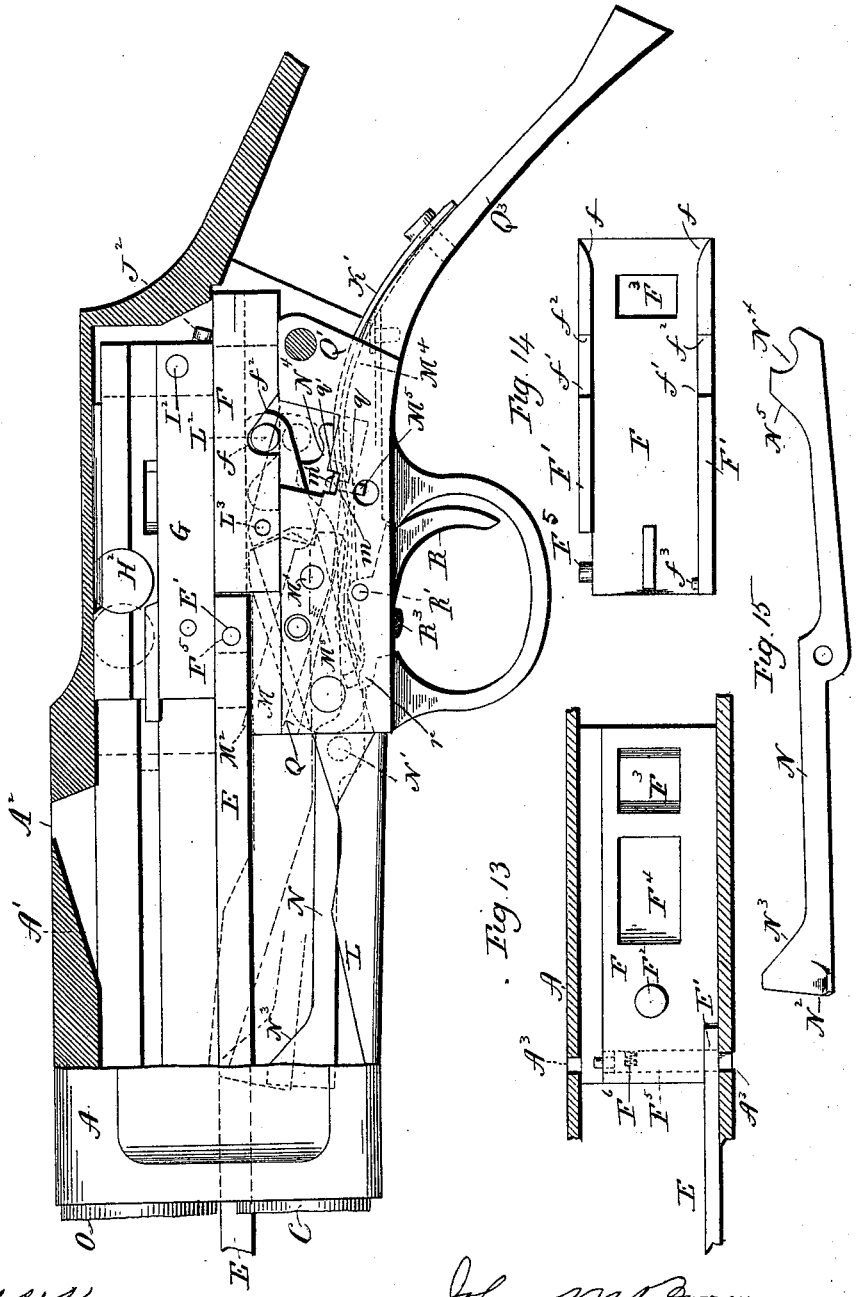

(No Model.) 6 Sheets—Sheet 4.
J. M. BROWNING.
MAGAZINE FIREARM.
No. 577,281. Patented Feb. 16, 1897.
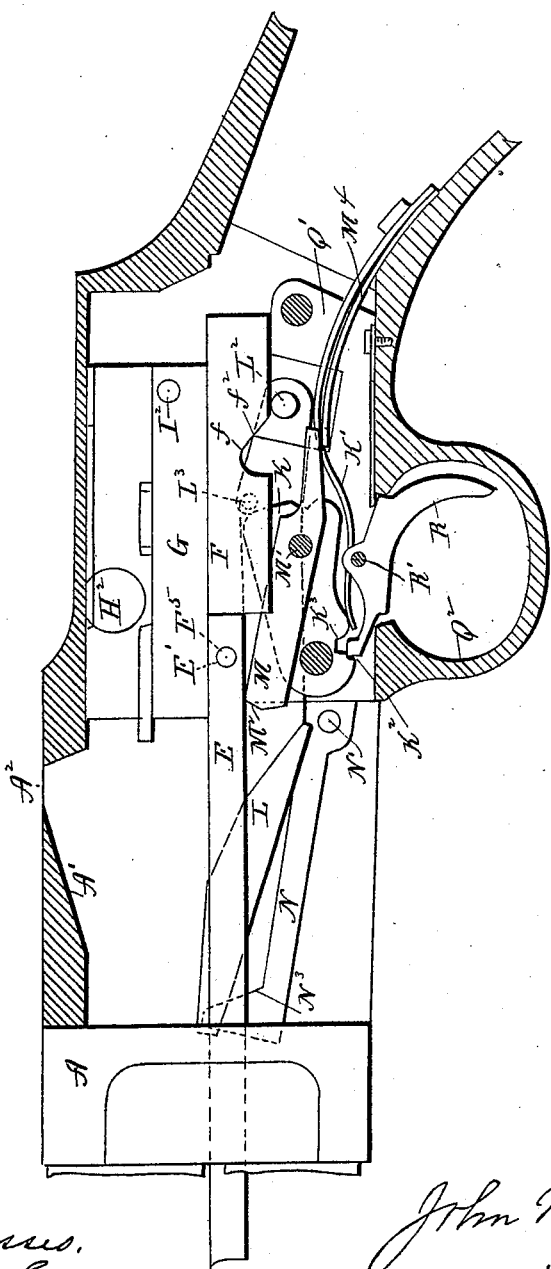
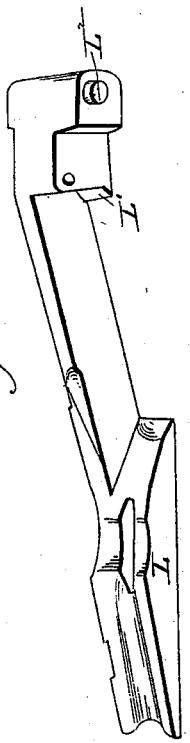

(No Model.)  6 Sheets—Sheet 5.
J. M. BROWNING.
MAGAZINE FIREARM.
No. 577,281.  Patented Feb. 16, 1897.
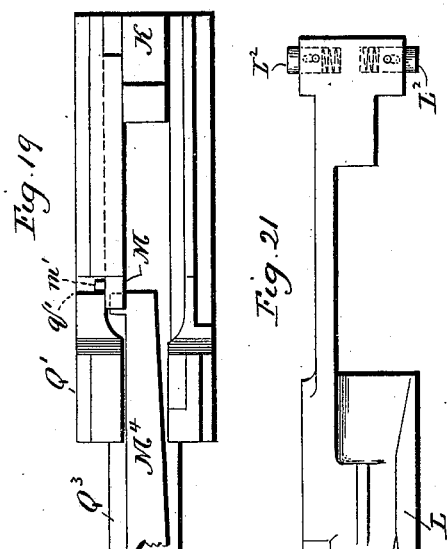
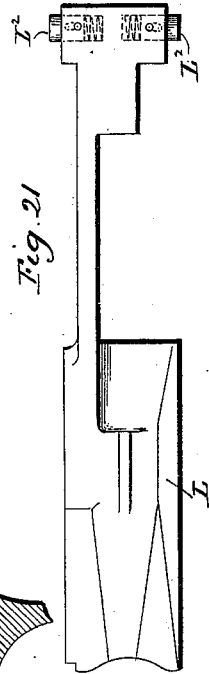
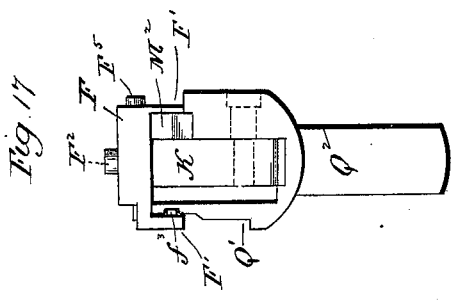
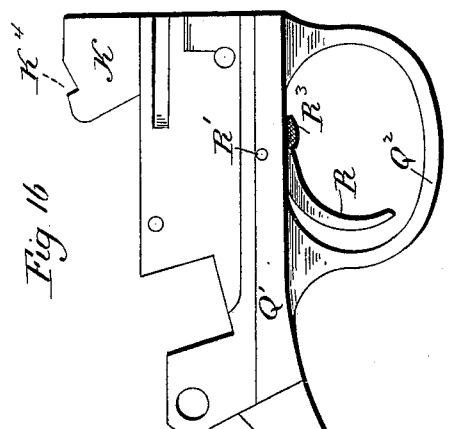
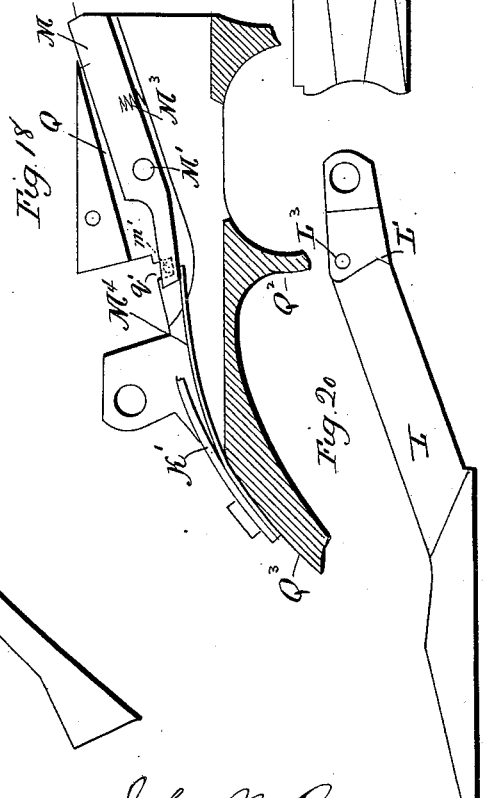

(No Model.) 6 Sheets—Sheet 6.
J. M. BROWNING.
MAGAZINE FIREARM.
No. 577,281. Patented Feb. 16, 1897.
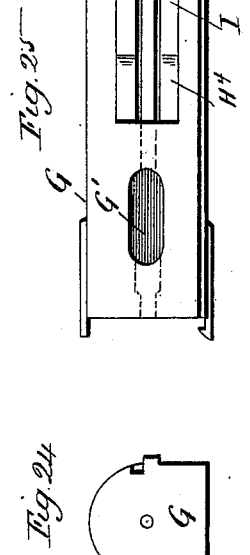
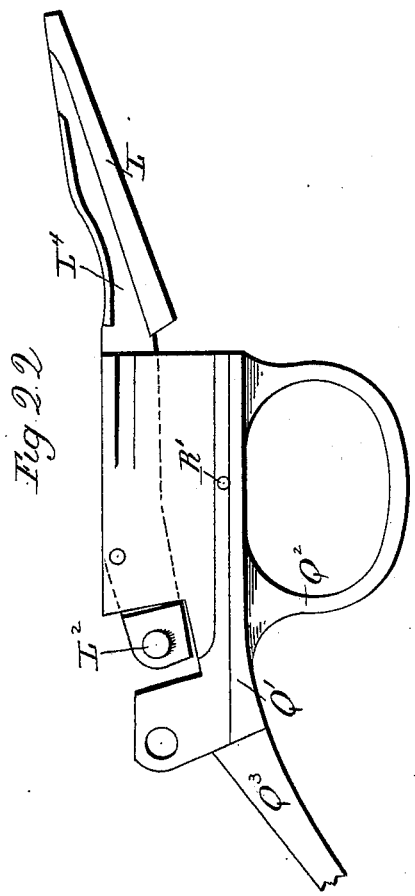
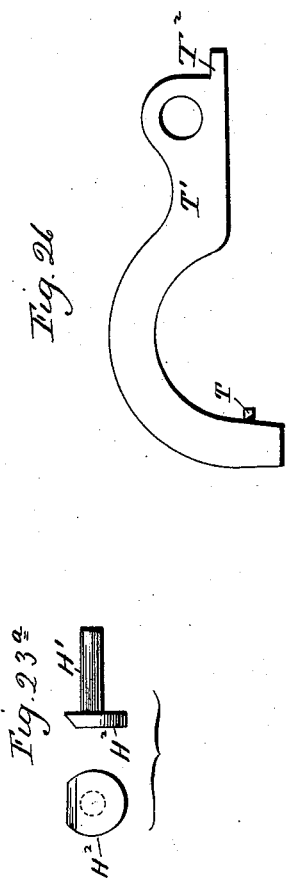
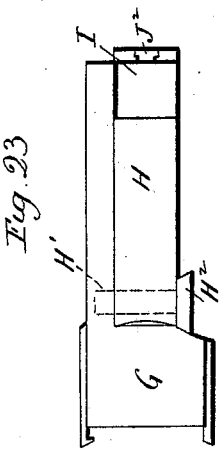
THE NORRIS PETERS CO., PHOTO-LITHO., WASHINGTON, D. C.

UNITED STATES PATENT OFFICE.

JOHN M. BROWNING, OF OGDEN, UTAH, ASSIGNOR TO THE WINCHESTER REPEATING ARMS COMPANY, OF NEW HAVEN, CONNECTICUT.

MAGAZINE-FIREARM.

SPECIFICATION forming part of Letters Patent No. 577,281, dated February 16, 1897.

Application filed March 16, 1896. Serial No. 583,357. (No model.)

*To all whom it may concern:*

Be it known that I, JOHN M. BROWNING, of Ogden, in the county of Weber and State of Utah, have invented a new Improvement in Magazine-Firearms; and I do hereby declare the following, when taken in connection with the accompanying drawings and the letters of reference marked thereon, to be a full, clear, and exact description of the same, and which said drawings constitute part of this specification, and represent, in—

Figure 1, a broken view, in side elevation, of one form which a gun constructed in accordance with my invention may assume; Fig. 2, a view thereof in vertical transverse section on the line $a\,b$ of Fig. 1; Fig. 3, a detached view in elevation of the forward end of the gun-frame; Fig. 4, a view of the gun in vertical transverse section on the line $c\,d$ of Fig. 1; Fig. 5, a detached broken view, partly in elevation and partly in section, showing the rear end of the gun-barrel and the coupling and compensating collars applied thereto; Fig. 6, a detached view of the coupling-collar; Fig. 7, a detached view of the compensating collar; Fig. 8, a perspective view thereof; Fig. 9, a broken view, partly in elevation and partly in section, of the forward end of the magazine and the plug located therein; Fig. 10, a broken view, partly in vertical section and partly in elevation, of the gun with the several elements of its action mechanism shown in the positions due to them when the gun is closed and the hammer is down; Fig. 11, a similar but less comprehensive view showing the breech-bolt slide in the position which it has just before it begins to lift the recoil-block into its locked position; Fig. 12, a view corresponding to Fig. 10, but showing the elements of the action mechanism in the positions due to them when the gun is fully opened; Fig. 12$^a$, a view corresponding to the preceding figure so far as the positions of the parts are concerned, but with the near side of the tang-head broken away to show the parts in full lines instead of relying upon their indication by dotted lines, as in the preceding figure; Fig. 13, a view, partly in plan and partly in horizontal section, showing the breech-bolt slide, the rear end of the action-bar, and the gun-frame, the coupling-pin mounted in the slide being alined with the hole in the action-bar and with holes formed in the frame for the insertion of the coupling-pin; Fig. 14, a detached reverse view of the breech-bolt slide; Fig. 15, a view in side elevation of the combined cartridge-stop and carrier-spring; Fig. 16, a detached view, in side elevation, of the tang-head, tang, and hammer; Fig. 17, a view in front elevation of the tang-head, the hammer, and the breech-bolt slide; Fig. 18, a broken view thereof in longitudinal section and designed particularly to show the safety-dog; Fig. 19, a broken plan view thereof, showing the safety-dog and the heavy safety-dog spring; Fig. 20, a detached view, in side elevation, of the carrier; Fig. 21, a plan view thereof; Fig. 21$^a$, a detached perspective view of the carrier; Fig. 22, a broken view, in side elevation, of the tang-head and carrier with reference to showing the groove formed in one of the side walls of the latter; Fig. 23, a detached plan view of the breech-block; Fig. 23$^a$, a view showing in front and in side elevation the pivot-pin which pivotally connects the recoil-block with the breech-block; Fig. 24, a view thereof in front elevation; Fig. 25, a reverse plan view thereof; Fig. 26, a detached view of such a key as may be used in connection with the assemblance and taking down of the gun.

My invention relates to an improvement in that class of firearms in which the action mechanism is operated by means of a sliding handle located forward of the frame of the arm and arranged to be reciprocated back and forth in a line parallel or substantially parallel with the axis of the gun-barrel.

The main object of my present invention is to provide a gun of the class described with simple and effective means for preventing the user of the arm from prematurely opening the gun in the interval between the falling of the hammer and the explosion of the cartridge by exerting a premature rearward draft upon the sliding handle. Further objects of my invention are to produce a simple, compact, and reliable gun composed of comparatively few parts, and not liable to accident or derangement, and constructed with particular reference to convenience, reliability, and safety of operation.

With these ends in view my invention consists in the combination, in a gun, with the action mechanism thereof, of a sliding handle for operating said mechanism, and means released by the recoil following the firing of the gun for locking the gun closed and against being prematurely opened by rearward draft exerted upon the sliding handle when the gun is fired.

My invention further consists in a safety-dog combined with the action mechanism of a gun and constructed and arranged to block the rearward movement of the sliding handle in case rearward draft is exerted thereupon when the gun is closed and before the cartridge has exploded.

My invention further consists in a safety-dog constructed and arranged to be controlled in being retired by the falling action of the hammer, unless at the time that occurs it is engaged and held in its active or blocking position as a consequence of the exertion of rearward draft upon the handle at the time the hammer is released.

My invention further consists in the combination, with a hammer, of a carrier constructed and arranged to exert trigger restraint upon it until the breech-closure of the gun has been moved into its closed position.

My invention further consists in the combination, with a breech-closure, of a slide therefor, a hammer, and a pivotal cartridge-carrier constructed and arranged to engage with the hammer and exert a trigger restraint thereupon until after the breech-closure has been moved into its closed position, when it is disengaged by the slide and allowed to fall, at which time it lets go of the hammer.

My invention further consists in the combination, with a breech-closure, of a pivotal recoil-block mounted therein, and means for lifting the block to engage the same with the frame of the gun when the closure is in its closed position.

My invention further consists in the combination, with a breech-closure, of a slide by means of which the same is actuated back and forth, a recoil-block pivotally mounted in the breech-closure, and a tumbler mounted in the closure and coacting with the recoil-block to move the same into its operative position and into its retired position.

My invention further consists in the combination, with a breech-closure, of a firing-pin mounted therein, a breech-closure slide, a pivotal recoil-block mounted in the breech-closure, a tumbler mounted in the breech-closure and coacting with the recoil-block for the operation of the same, with the slide for the connection of the same with the breech-closure, and with the firing-pin for retracting the same.

My invention further consists in a combined cartridge-stop and carrier-spring located within the frame and forming a stop for the cartridges in the magazine, and also forming a spring for the carrier.

My invention further consists in the combination, with a gun-frame formed with alined transverse holes in its opposite walls, of a breech-closure slide, a longitudinally-movable transversely-arranged coupling-pin mounted in the slide, and an action-bar having a hole formed in its rear end, the holes in the frame, the coupling-pin of the slide, and the hole in the action-bar alining when the slide and the action-bar are at the limit of their rearward movement.

My invention further consists in the combination, with a gun-frame, of a removable barrel having its rear end formed with continuous and interrupted threads, a coupling-collar mounted on the continuous threads of the barrel, and a sliding compensating collar non-rotatably placed over the interrupted threads of the barrel, so as to be interposed between the coupling-collar and the frame when the gun is assembled.

My invention further consists in the combination, with a gun-frame, of a removable barrel and a removable magazine, a coupling-collar mounted upon the barrel, a compensating collar mounted upon the barrel and provided with a stop-lug coacting with a projection upon the frame and with the magazine for preventing the barrel from being rotated in either direction, and stops located upon the magazine for preventing the same from being turned in either direction after the gun is assembled.

My invention further consists in certain details of construction and combinations of parts, as will be hereinafter described, and pointed out in the claims.

For the illustration of my invention I have chosen to show it as embodied in a tubular magazine-gun of the take-down type, but I would have it understood that I do not limit myself to the use of all of the various features of my invention in combination with such a gun.

As herein shown, the gun comprises a frame A, a removable barrel B, a tubular magazine C, located below the barrel, a sliding handle D, mounted upon the magazine so as to move back and forth in a line parallel or substantially parallel with the longitudinal axis of the gun-barrel, an action-bar E, rigidly connected with the handle and extending rearwardly therefrom, a breech-bolt slide F, coupled with the rear end of the action-bar, a breech-bolt G, loosely connected or articulated with the slide by means of which it is operated, but which has sliding movement independent of it, a pivotal recoil-block H, mounted in the breech-bolt, an operating-tumbler I, also mounted in the breech-bolt and coacting with the recoil-block and the breech-bolt slide, a firing-pin J, mounted in the breech-bolt and coacting with the tumbler, a hammer K, which is cocked by the said slide when the gun is opened, a pivotal cartridge-carrier L, a safety-dog M, a combined cartridge-stop and carrier-spring N, a coupling-collar O, and a non-rotatable compensating collar P, together with other features to be hereinafter detailed.

In the foregoing paragraph I have used the terms "breech-bolt" and "breech-bolt slide," and shall hereinafter use them in describing the particular gun chosen for the illustration, notwithstanding the fact that in the statement of the nature of my invention and in some of the claims I shall employ the terms "breech-closure" and "breech-closure slide," for I would have it understood that my invention in some of its phases comprehends the employment of breech-closures of other forms than the breech-bolt form.

In providing against the premature opening of the gun in case the user exerts a premature rearward draft upon the sliding handle at the time he pulls the trigger R, I employ a blocking-piece in the form of a safety-dog M, Figs. 10, 12, 17, 18, and 19, located in a recess Q, formed to receive it in the left-hand wall of the chambered tang-block $Q'$, the trigger-guard $Q^2$ and the tang $Q^3$ being made, as shown, integral with the said block. The safety-dog is hung upon a horizontal stud or pin $M'$, located to the rear of its longitudinal center, and has limited oscillating movement in a vertical plane. Its forward end is formed with an operating-face $M^2$, which is struck on a circle of which the pin $M'$ is the center. A light spiral spring $M^3$, located beneath the forward end of the dog, exerts a constant effort to lift its forward end into its active or blocking position, in which it coacts with the rear end of the breech-bolt slide F. This spring I shall hereinafter refer to as the "light" safety-dog spring. A flat spring $M^4$, engaged with the lower edge of the rear end of the dog, and superior in power to the spring $M^3$ before mentioned, is employed to overcome the spring $M^3$ and swing the dog into its retired position under normal conditions in the operation of the arm, that is to say, when the user of the arm is not exerting a premature rearward draft upon the sliding handle D thereof at the time he pulls the trigger R. As the spring $M^4$ is superior in power to the spring $M^3$, I shall for convenience refer to it hereinafter as the "heavy" safety-dog spring. The said spring $M^4$ is located parallel with and beneath the flat hammer-spring $K'$ in such a manner that when the hammer is cocked, as shown in Fig. 12, the hammer-spring will depress the heavy safety-dog spring, so as to take the tension thereof from the safety-dog and leave the light safety-dog spring free to act in elevating the nose of the dog into its blocking position. On the other hand, when the hammer falls and the hammer-spring $K'$ rises it permits the heavy safety-dog spring to lift and coact with the rear end of the safety-dog in such a manner as to compress the light safety-dog spring and swing the dog on its fulcrum, so as to depress its nose into its retired position, in which it clears the breech-bolt slide. The cocking of the hammer, as before explained, retires the heavy safety-dog spring and permits the light safety-dog spring to act in lifting the nose of the safety-dog into its blocking position.

Now if the gun is fired properly and without the exertion of any rearward draft upon the sliding handle at the time of pulling the trigger the falling of the hammer will permit the heavy safety-dog spring to assert itself and overcome the light safety-dog spring and retire the nose of the safety-dog, so as to clear the way for the opening of the gun after the same has been fired; but, on the other hand, if the user is exerting a premature rearward draft upon the sliding handle at the time he pulls the trigger the rear end of the breech-bolt slide will be jammed against the uplifted nose of the safety-dog with such force that although the falling of the hammer releases the heavy safety-dog spring and permits the same to act upon the rear end of the safety-dog it is unequal to the task of overcoming not only the tension of the light safety-dog spring but also the friction developed between the nose of the dog and the slide consequent upon the jamming of the former against the latter. Under these conditions the safety-dog will keep its blocking position notwithstanding the falling of the hammer, so that the opening of the gun will be blocked, no matter how hard the user pulls upon the sliding handle, until after the cartridge explodes, when the ensuing recoil will involuntarily relieve the friction between the dog and slide and permit the heavy safety-dog spring to move the same into its retired position.

It will be seen from the foregoing that by means of my invention the normal or proper firing of the gun is in no wise interfered with, but that the safety-dog is in constant readiness to prevent a wrong use of the gun and to avoid the premature opening thereof in case the user exerts a premature draft upon the sliding handle at the time of firing.

To provide for opening the gun after it has been closed and the hammer cocked, I employ an unlocking-pin $M^5$, Figs. 10 and 12, mounted so as to be vertically reciprocated in the chambered tang-head $Q'$, as best shown in Fig. 12. The lower end of this pin extends into a recess $q$, formed in the tang-head, while its upper end is provided with a small plate $m$, located in a small rectangular slot $q'$, formed in the tang-head $Q'$. The plate $m$ engages with an outwardly-projecting lifting-pin $m'$, mounted in the rear end of the safety-dog.

As before stated, when the gun is closed and the hammer cocked the heavy safety-dog spring is retired to permit the light safety-dog spring to lift the nose of the dog into its blocking position, so that the gun cannot be opened except by the falling of the hammer or with the assistance of the recoil following the explosion of the cartridge unless the unlocking-pin is brought into play by lifting it, so as to cause it to swing the safety-dog on its fulcrum and move its nose into its retired position, which permits the gun to be opened without firing it. Such an unlocking-pin or its equivalent is desirable because the hammer K of the gun, being a concealed hammer, is inaccessible for manual operation and cannot be let down without exploding the cartridge, whereby some provision for unlocking the gun independent of the falling of the hammer is required.

In my improved arm the carrier has a trigger function in the sense that it maintains a trigger-hold upon the hammer until after the breech-bolt has been moved into its closed position and located therein.

In adapting the carrier to perform a trigger function and maintain a trigger-hold upon the hammer until the gun is closed and locked I construct the carrier with a trigger-nose $L'$, which takes into a notch $K^4$, formed in the top of the hammer K, which is also constructed with a cocking-notch $K^2$, formed in its lower end, for the reception of the nose $r$ of the trigger R, which is hung upon a horizontal pin $R'$, operated by a trigger-spring $R^2$, and furnished with a locking-slide $R^3$, all as clearly shown in Figs. 10 and 12. The cocking-notch $K^2$ is located below a notch $K^3$, formed in the lower end of the hammer, for the reception of the hammer-spring $K'$. The hammer, carrier, and trigger are so constructed that when the hammer is cocked it will be held so by the trigger; but in case the trigger is pulled so as to release the hammer the same will almost immediately come into restraining engagement with the carrier, which will hold it in a practically full-cocked position until the gun is closed and locked. Furthermore, if the gun is being fired automatically, with the trigger held back so as to take no part in its operation, the carrier will assume the entire trigger function of the arm and engage with the hammer for holding it in its cocked position, and so hold it until the gun is closed and locked. The carrier is lifted into its highest position, which is its position for delivering a cartridge to the gun-barrel, and which also is its position in which it performs its trigger function, by means of the breech-bolt slide F, which also lets go of the carrier and permits the same to drop and release the hammer for the firing of the gun.

For the coaction of the carrier and breech-bolt slide the former is furnished with two spring-actuated operating-pins $L^2 L^2$, horizontally arranged in its extreme rear end and projecting from its opposite side walls, as best shown in Fig. 21. These pins are located in rear of the carrier pivot-pin $L^3$, by means of which the carrier is pivotally mounted in the chambered central portion of the tang-head $Q'$. To adapt the breech-bolt slide to coact with the yielding operating-pins $L^2 L^2$ of the carrier, it is constructed with two parallel flanges $F' F'$, depending from its opposite edges. The inner faces of the extreme rear ends of each of these flanges are beveled, as at $f f$, to adapt them to coact with the pins, which are forced inwardly against the tension of their springs by the said bevels when the slide is toward the limit of its rearward movement. Each of these flanges $F'$ is also formed with a notch $f'$, having a straight forward wall and an inclined rear wall $f^2$, the two notches $f' f'$ being located directly opposite each other. In the rear movement of the slide the bevels $f f$ engage with the pins and force the same inward, after which they ride upon the inner faces of the rear ends of the flanges until they are brought into range with the notches $f' f'$, when they spring outward into the same. The forward movement of the slide occurring, the pins coact with the beveled rear walls $f^2 f^2$ of the notches in lifting the carrier to its highest position, after which the pins ride upon the lower edges of the rear ends of the flanges. Now just before the said ends of the flanges clear the pins an inwardly-projecting supporting-stud $f^3$ enters a long groove $L^4$, formed in one of the side walls of the carrier and extending nearly to the forward end thereof. The said supporting-stud $f^3$ coacts with the upper wall of the groove $L^4$ in supporting the carrier until after the breech-bolt has been moved into its closed position and located therein, whereby the carrier is kept in position to maintain its trigger-hold upon the hammer; but when the supporting-stud emerges from the forward end of the groove $L^4$ the carrier is thrown down into its depressed position by the action of the combined cartridge-stop and carrier-spring N, Fig. 15, whereby the carrier is caused to release the hammer, which falls and explodes the cartridge; but the carrier has this action only when the trigger is held back, as before stated.

The breech-bolt slide F is connected with the breech-bolt G not only in such a manner as to move the same into its open and closed positions, but also in such a manner as to permit it to have independent movement thereof, for the slide is relied upon to lock the breech-bolt after the same has reached its closed position and to unlock it before the gun is opened. A loose connection is thus required between the breech-bolt and breech-bolt slide. For moving the breech-bolt into its open position the breech-bolt slide is provided at its forward end with a heavy, short, upwardly-extending operating-pin $F^2$, which takes into a longitudinally-arranged slot $G'$, formed in the lower face of the forward end of the breech-bolt G, as seen in Figs. 11 and 25. The length of this slot represents the extent of movement which the slide and block have independently of each other. Suppose, for illustration, the gun to be fully closed. Then at the beginning of its opening movement the breech-bolt slide moves back without disturbing the breech-bolt until the pin $F^2$ of the slide engages with the rear end wall of the slot G' in the breech-bolt, which will then be picked up by the slide, so to speak, and be moved rearward with it. The breech-bolt is moved into its closed position by the breech-bolt slide through the engagement thereof with the tumbler I, mounted in the breech-bolt, which, through the medium of the said tumbler, is pushed forward, with its forward end projecting beyond the forward end of the slide, until it reaches its fully-closed position, when it is stopped by the engagement of its said end with the breech end of the gun-barrel. The slide then moves forward alone until it reaches the limit of its forward movement, and during this time locks the bolt.

For locking the breech-bolt in its closed position I employ a recoil-block H, Figs. 10 and 11, which is swung by its forward end upon a horizontal pivot-pin H', mounted in the breech-block. The said end of the recoil block is knuckle-shaped and enters a knuckle-shaped recess G², formed in the breech-bolt by means of a suitable boring-tool corresponding in curvature to the said end of the block, the outer end of the said recess being closed, after the block is in place, by means of a circular head H², formed upon the outer end of the pivot-pin H'. The upper edge of the rear end of the recoil-block is adapted to enter a locking-notch A', formed in the gun-frame A. As herein shown, this notch is cut through the top of the frame, as at A², but that is not necessary. The rear end of the recoil-block is constructed with a knuckle-shaped notch H³, which receives the knuckle-shaped forward end I³ of the upper arm of the pivotal tumbler I, which is mounted in the rear end of the breech-bolt upon a horizontal tumbler-pin, as plainly shown in Figs. 10 and 11. An arm H⁴, formed upon the lower edge of the rear end of the recoil-block as an incident of forming the notch H³ therein, extends downward into a clearance-recess F⁴, formed to receive it in the upper face of the breech-bolt slide, and clearly shown in Fig. 13. The said tumbler I is constructed with a downwardly-depending rear arm I', which enters a rectangular opening F³, formed to receive it in the rear end of the slide which actuates the tumbler, and hence operates the recoil-block. The said connection of the tumbler with the breech-bolt slide also provides for the pushing forward of the breech-bolt by the breech-bolt slide, which acts through the medium of the tumbler, as already set forth. The firing-pin J, which may be of any approved construction, is retracted through the medium of the said tumbler, which is constructed with a longitudinal slot to receive the rear portion of the pin, which is formed at its extreme rear end with a head J², which engages with the rear edge of the arm I' of the tumbler. The arm H⁴ of the recoil-block is also longitudinally slotted for the reception and clearance of the rear portion of the firing-pin, as shown in Fig. 11. When the slide is moved into its fully-closed position, the tumbler clears the head J² of the pin, as shown in Fig. 10, but in the initial starting rearward movement of the slide the rear edge of the arm I' of the tumbler engages with the head J² of the pin and retracts the same, as shown in Fig. 11.

In the forward movement of the breech-bolt and breech-bolt slide the former reaches its closed position before the latter reaches the limit of its forward movement, as shown in Fig. 11. Now as the slide is moved along into its closed position the coupling-tumbler I is swung on its pin and the recoil-block H lifted into the locking-notch A', as shown in Fig. 10, whereby the bolt is adapted to take the recoil of the explosion of a cartridge. At the beginning of the opening movement of the gun the slide moves back alone and without disturbing the bolt, and swings the coupling-tumbler I on its pivot, causing the said tumbler to positively draw the recoil-block down into its retired position, as shown in Fig. 11, after which the bolt and slide move rearward together. I will call attention in this connection to the fact that the breech-bolt is very short as compared with breech-closures of the bolt type as ordinarily constructed, whereby I avoid extending the rear end of the bolt out of the frame in opening the arm, and whereby also I secure a complete housing at all times of the bolt within the frame, to obvious advantage. I am enabled to thus shorten the bolt and compact the frame by employing a pivotal recoil-block mounted entirely in the breech-bolt.

The combined cartridge-stop and carrier-spring N, Figs. 10, 12, and 15, is located within the right-hand side wall of the frame and hung upon a horizontal stud N'. The lower edge of the forward end of this combined part is shaped to form a cartridge-stop N², while the upper edge of the said end is constructed with a bevel N³, which coacts with the forward end of the breech-bolt slide in swinging the combined part, so as to retire the stop N² at its forward end and to lift the notch N⁴, formed in its elastic rear end, into engagement with the right-hand pin of the two pins L² L² of the carrier, whereby the same is put under the spring-tension derived from springing that portion of the combined part lying to the rear of the stud N' on which the same is hung. The rear end of the said part is also constructed with a bevel N⁵, which is engaged by the rear end of the carrier to swing the combined part, so as to lift its stop N² into position to act to control the egress of the cartridges from the magazine into the chambered forward end of the frame of the gun. It will be noted that the breech-bolt slide does not engage with the bevel N³ until just before it goes into its fully-closed position, so that not until then is the carrier placed under the tension of the rear end of the said combined part N, the carrier being placed under the tension of the pawl immediately before its forward end is released from the slide by the emergence of the supporting-stud $f^3$ thereof from its groove $L^4$. The carrier is therefore under spring-tension only when the slide is very near to its closed position and in its closed position. When the slide is in its closed position, the carrier may be said to have the function of a loading-trap and the combined part N the function of a loading or trap spring.

For the connection of the forward end of the breech-bolt slide with the rear end of the action-bar the said end of the slide is furnished with a transversely-arranged longitudinally-movable coupling-pin $F^5$, which is moved under the restraint of the spiral friction-spring $F^6$, Fig. 13. One end of this pin enters a hole $E'$, formed to receive it in the extreme rear end of the action-bar, as shown in Fig. 10. The said bar and slide are coupled and uncoupled when both are at the limit of their rearward movement, where the pin and the hole in the bar are brought into alinement with small holes $A^3$ $A^3$, formed opposite each other in the side walls of the gun-frame A and provided for the convenient insertion of a suitable tool for pushing the friction-pin in one direction or the other, according as it is desired to push it out of or into engagement with the action-bar.

The gun herein shown is what is known as a "takedown" gun, that is to say, a gun adapted to have its barrel and magazine conveniently detached from its frame to enable it to be more compactly packed for transportation.

The barrel B is provided with a depending lug $B'$, to which a magazine-plug $C'$ is pivotally attached by means of a horizontal pivot-pin $C^2$. This plug is externally threaded for entrance into the internally-threaded forward end of the tubular magazine C, which is virtually extended and contracted in length by being rotated in one direction or the other upon the plug. When the rear end of the magazine is disconnected from the frame of the arm, the magazine may be thrown down into a position at a right angle to the barrel, at which time it may be utilized as a lever for rotating the same for the attachment of the barrel to the frame and its detachment therefrom.

The rear end of the barrel is reduced in diameter and formed with a band of continuous screw-threads $B^2$ and with two sets of sectional screw-threads $B^3$ $B^3$, separated by clearance-spaces $B^4$ $B^4$. Over the continuous screw-threads $B^2$, I place an internally-threaded compensation or take-up collar O, the forward edge of which abuts against the shoulder $B^5$, formed upon the barrel by reducing the rear end thereof. This collar is operated for taking up wear by turning it as required. Its adaptation to be seized for turning may, of course, be varied. As shown in Fig. 6, it is formed with a radial pin-hole $o$, designed to receive a pin mounted in a key $T'$, such as shown in Fig. 26, the key also having a pin $T^2$ for use in operating the coupling-pin $F^5$, mounted in the breech-bolt slide.

Over the forward portions of the interrupted threads $B^3$ $B^3$, I locate a non-rotatable coupling-collar P, the forward edge of which abuts against the rear edge of the take-up collar O. To lock the said collar P against rotation without interfering with its sliding, it is constructed, as shown, with two inwardly-projecting flanges $P'$ $P'$, which enter the clearance-spaces $B^4$ $B^4$ aforesaid. The said collar is furnished with a stop-lug $P^2$, the function of which will be set forth later on.

The forward end of the gun-frame A is constructed with a circular opening $A^4$ for the reception of the rear end of the magazine and with a corresponding but slightly-larger opening $A^5$ for the reception of the rear end of the gun-barrel. The walls of the opening $A^5$ are constructed with two sets of interrupted threads $a$ and $a$, corresponding to the interrupted threads $B^3$ $B^3$ of the barrel, and with clearance-spaces $a'$ $a'$, corresponding to the clearance-spaces $B^4$ $B^4$ of the barrel. It will be understood from this description that by registering the clearance-spaces $B^4$ $B^4$ of the barrel with the interrupted threads $a$ $a$ of the frame and thus also registering the interrupted threads $B^3$ $B^3$ of the barrel with the clearance-spaces $a'$ $a'$ of the frame the barrel may be inserted into the frame so as to bring the rear edge of the non-rotatable collar P into abutment with the forward face of the frame. Then if the barrel is rotated for a quarter-turn the threads $B^3$ $B^3$ will take into the threads $a$ $a$, binding the barrel to the frame. After the barrel has been rotated a quarter-turn the stop-lug $P^2$ of the collar P, which is rotated with the barrel, engages with a stop S, located in the forward end of the frame and shown in Fig. 3 as consisting of a screw.

After the barrel has been connected with the frame, as described, the magazine is swung on its pivot $C^2$ and brought into line with the magazine-opening $A^4$ in the frame, after which the magazine is rotated, so as to extend it and cause its rear end to enter it and take a full bearing in the said opening.

After the magazine has been located, as described, the action-bar of the sliding handle is passed rearward through the opening $A^6$, Fig. 3, formed in the forward end of the frame to permit it to enter the same for connection with the breech-bolt slide.

After the magazine is in place the coupling-collar, and hence the barrel, are prevented from rotating by the engagement of the lower edge of the stop-lug $P^2$ of the said collar with the upper portion of the magazine, as clearly seen in Fig. 2, which shows that when the magazine is in place the barrel cannot be rotated in either direction.

After the action-bar is in place the magazine itself is prevented from rotating in one direction by means of an action-bar stop-pin $C^3$, mounted in it and engaging with the lower edge of the bar, and in the opposite direction by means of a take-up-collar stop-pin C⁴, which engages with the lower face of the take-up collar O.

To "take down" the gun, as the phrase is, the uncoupling-pin T² of the key T is forced into the left-hand hole A³ in the gun-frame A and engaged with the friction coupling-pin F⁵, which is pushed inward out of the hole E' in the action-bar E, which is thus disconnected from the breech-bolt slide. The sliding handle D is now moved forward upon the magazine, carrying the action-bar with it and clearing the rear end of the action-bar from the frame and from the action-bar stop-pin C³ on the magazine, which may now be rotated from left to right until its rear end is cleared from the opening A⁴ of the frame. The magazine-follower is then pushed back, so as to clear the frame, after which the magazine is swung outward away from the barrel, thus clearing the stop-lug P² of the non-rotatable coupling-collar P from the magazine. The magazine, now transformed into a lever, is used for turning the barrel a quarter-turn back, so as to clear its interrupted threads B³ B³ from the interrupted threads a a of the frame, from which the barrel and magazine are now free to be detached. The take-up collar O, it will of course be understood, is never to be disturbed except to take up wear, when it is turned so as to be moved rearward, thus crowding the coupling-collar rearward also and bringing the same into closer contact with the forward end of the gun-frame.

It is apparent that in carrying out my invention some changes from the construction herein shown and described may be made. I would therefore have it understood that I do not limit myself to the exact construction shown, but hold myself at liberty to make such changes and alterations as fairly fall within the spirit and scope of my invention.

Having fully described my invention, what I claim as new, and desire to secure by Letters Patent, is—

1. In a firearm, the combination with the action mechanism thereof, of a sliding handle located forward of the said mechanism and adapted to be reciprocated back and forth in a line parallel or substantially parallel with the longitudinal axis of the gun-barrel, a blocking-piece released by the recoil following the firing of the gun, and coacting with a member of the action mechanism for blocking the gun against being prematurely unlocked and opened by a rearward draft exerted upon the sliding handle when the gun is fired.

2. In a firearm, the combination with the frame thereof, of action mechanism located therein, a sliding handle located forward of the said mechanism, and adapted to be reciprocated back and forth in a line parallel or substantially parallel with the axis of the gun-barrel, an action-bar extending rearwardly from the handle into the frame within which it is connected with the action mechanism for operating the same, a blocking-piece located within the said frame, constructed and arranged to be released for retirement by the recoil following the firing of the gun, and coacting with a member of the action mechanism for blocking the gun against being prematurely unlocked and opened by a rearward draft exerted upon the sliding handle when the gun is fired, means for moving the said blocking-piece into its blocking position, and means for retiring the said blocking-piece when the same is released by the recoil following the firing of the gun.

3. In a firearm, the combination with the action mechanism thereof, including a breech-closure and a recoil-block; of a sliding handle located forward of the said action mechanism and adapted to be reciprocated in a line parallel or substantially parallel with the longitudinal axis of the gun-barrel; an action-bar extending rearwardly from said handle into the frame, and connected with the action mechanism for operating the breech-closure, and for operating the recoil-block to lock and unlock the gun; and a blocking-piece released for retirement by the recoil following the firing of the gun, and coacting with a member of the action mechanism for blocking the gun against being prematurely unlocked and opened by rearward draft exerted upon the handle when the gun is fired, substantially as described.

4. In a firearm, the combination with the frame thereof, of action mechanism including a breech-closure, a breech-closure slide and a recoil-block, a sliding handle located forward of the action mechanism and adapted to be reciprocated back and forth in a line parallel or substantially parallel with the longitudinal axis of the gun-barrel and connected with and operating the said breech-closure, breech-closure slide and recoil-block, a blocking-piece in the form of a safety-dog, released by the recoil following the firing of the gun and coacting with the breech-closure slide to block the same and prevent the premature unlocking and opening of the gun by rearward draft upon the sliding handle when the gun is fired, a spring arranged to move the said dog into its active or blocking position, and means under the control of the firing mechanism of the gun for retiring the dog when it is so released, against the tension of the said spring.

5. In a firearm, the combination with the action mechanism thereof, of a sliding handle for operating the said mechanism, a safety-dog for blocking the opening of the gun by rearward draft exerted upon the sliding handle when the gun is fired, a light spring arranged to move the dog into its active or blocking position, a heavier spring for retiring the dog, and means for cutting out the heavy safety-dog spring to permit the light safety-dog spring to act, substantially as set forth.

6. In a firearm, the combination with the action mechanism thereof, of a sliding handle for operating the said mechanism, a safety-dog for blocking the gun against being prematurely opened by rearward draft exerted upon the sliding handle when the gun is fired, a light safety-dog spring for moving the dog into its blocking position, a heavy safety-dog spring for moving the dog into its retired position, and a hammer constructed and arranged to act upon the safety-dog spring whereby the same is cut out of action when the hammer is cocked, substantially as described.

7. In a firearm, the combination with the frame thereof, of action mechanism, a sliding handle located forward of the same and adapted to be reciprocated back and forth in a line parallel or substantially parallel with the longitudinal axis of the gun-barrel, a safety-dog against which a member of the action mechanism is jammed in case of premature rearward draft upon the sliding handle, whereby the gun is prevented from being prematurely unlocked and opened, a spring for moving the dog into its blocking position, and means, under the control of the firing mechanism of the gun, for retiring the dog when it is released from the jamming action of the coacting member of the action mechanism by the recoil following the firing of the gun.

8. In a firearm, the combination with the action mechanism thereof including a breech-closure slide, of a sliding handle connected with the said mechanism for operating the same, a tang-head, a safety-dog mounted in the said tang-head in position to engage with the breech-closure slide for blocking the same in its closed position, a light safety-dog spring for moving the dog into its active position, and a heavy safety-dog spring adapted to be cut into and out of operation under the control of the hammer of the arm, substantially as described.

9. In a firearm, the combination with the hammer thereof, of a pivotal carrier constructed and adapted to engage with the hammer and restrain the same until the gun is virtually closed, and a trigger also coacting with the hammer, substantially as described.

10. In a firearm, the combination with a hammer having a notch formed in its top, of a pivotal carrier constructed with a trigger-tooth arranged to take into the notch in the hammer and hold the hammer in its cocked position until the gun is virtually closed, substantially as described.

11. In a firearm, the combination with the hammer thereof, of a pivotal carrier having a trigger function, and constructed to have a trigger-hold upon the hammer until the gun is virtually closed, and a spring coacting with the carrier upon which it imposes its tension just as the gun is about to be fully closed, substantially as described.

12. In a firearm, the combination with a breech-bolt, of a breech-bolt slide connected with the breech-bolt for operating the same, a pivotal carrier connected with the said breech-bolt slide by means of which it is lifted into its highest position and sustained therein until the gun is virtually closed, a hammer engaged by the pivotal carrier, and held by the same as by a trigger until the gun is virtually closed, and a trigger also coacting with the hammer for releasing the same.

13. In a firearm, the combination with a breech-bolt slide having depending flanges, the rear ends of which are beveled, and which are notched forward of their said ends, and a pivotal carrier provided with yielding pins which are thrust inward by the said bevels, and which coact with the notches for lifting the carrier, substantially as set forth.

14. In a firearm, the combination with a longitudinally-movable breech-bolt, of a breech-bolt slide located below the said bolt and connected therewith for operating the same, and provided at its forward end with a laterally-projecting supporting-pin, and a pivotal carrier coacting at its rear end with the breech-bolt slide which lifts it into its highest position, and constructed in one of its side walls with a groove receiving the said pin which supports the carrier in such position until the gun is virtually closed.

15. In a firearm the combination with a breech-bolt slide having depending flanges and a supporting-pin, of a pivotal carrier provided with yielding pins which coact with the said flanges to lift the carrier and support the same in its lifted position for a time, the said carrier being also formed with a groove which receives the said pin which maintains the carrier in its lifted position until the gun is virtually closed, substantially as described.

16. In a firearm, the combination with the frame thereof, of a sliding handle located forward of the said frame, adapted to be reciprocated back and forth in a line parallel or substantially parallel with the longitudinal axis of the gun-barrel, and constructed with a rearwardly-extending action-bar; of a longitudinally-movable breech-bolt, a recoil-block pivotally mounted in the said bolt and movable upward for engagement with the frame, and downward for clearance therefrom, a breech-bolt slide located beneath the breech-bolt, and connected with the said action-bar, and a tumbler pivotally mounted in the breech-bolt and connected with the recoil-block and breech-bolt slide.

17. In a firearm, the combination with a breech-bolt, of a recoil-block pivotally mounted therein, and a tumbler also mounted in the breech-bolt and coacting with the recoil-block to lift the same into engagement with the frame and to retract it from such engagement, substantially as described.

18. In a firearm, the combination with a breech-bolt having a transverse horizontal recess formed in it, of a recoil-block pivotally mounted therein and having its forward end knuckle-shaped to fit into the said recess, and a pin mounted in the breech-bolt, forming a pivot upon which the recoil-block swings, and having one end provided with an enlarged head which fills the outer end of the said recess, substantially as described.

19. In a firearm, the combination with the breech-bolt, of a breech-bolt slide, a recoil-block pivotally mounted therein, a tumbler mounted in the breech-bolt coacting with the said block, and extending downward into connection with the breech-bolt slide, a reciprocating action-bar connected at its rear end with the said breech-bolt slide for operating the same, and a sliding handle connected with the forward end of the bar and movable back and forth in a line parallel or substantially parallel with the longitudinal axis of the gun-barrel, substantially as described.

20. In a firearm, the combination with a breech-bolt, of a recoil-block mounted therein, a tumbler also mounted in the breech-bolt and coacting with the recoil-block, a firing-pin mounted in the breech-bolt and engaging with the tumbler which retracts it after it has been fired, a breech-bolt slide located below the breech-bolt, and connected with the tumbler which it rocks for actuating the recoil-block and the firing-pin, an action-bar connected with the slide for operating the same, and a sliding handle located at the forward end of the action-bar for operating the same, substantially as described.

21. In a firearm, the combination with a breech-bolt, of a breech-bolt slide, a recoil-block, an operating-tumbler and a firing-pin mounted in the breech-bolt, and a breech-bolt slide constructed to operate the said tumbler which in turn operates the recoil-block and the firing-pin, substantially as described.

22. In a firearm, the combination with a frame having openings formed opposite each other in its side walls, of a breech-bolt closure, a coupling-pin movable under friction mounted in the forward end of the said slide and alining with the said holes when the slide is at the limit of its rearward movement, a sliding handle, and an action-bar extending rearwardly from the said handle, and receiving the said coupling-pin which is moved into or out of engagement with the action-bar by means of a tool inserted through the holes in the frame, substantially as described.

23. In a firearm, the combination with a tubular magazine and a carrier, of a combined cartridge-stop and carrier-spring pivotally mounted within the frame of the arm, and adapted at its forward end to form a magazine-stop and at its rear end to engage with the carrier and place the same under spring-tension, and means for operating the said combined part to elevate its rear end to place the carrier under its spring-tension just as the gun is closed, and to elevate its forward end to bring the same into play as a cartridge-stop at the proper time, substantially as described.

24. In a firearm, the combination with the frame thereof, of a removable barrel, a magazine connected therewith, a take-up collar mounted upon the barrel, and a non-rotatable sliding coupling-collar mounted on the barrel so as to be interposed between the take-up collar and the frame when the barrel and magazine are assembled with the frame, substantially as described.

25. In a magazine-firearm, the combination with the frame thereof, of a barrel having its rear end formed with continuous and interrupted screw-threads, a take-up collar placed over the said continuous threads, a non-rotatable sliding, coupling-collar placed over the interrupted threads, the exposed portions of which coact with corresponding threads formed in the forward end of the frame between which and the take-up collar, the coupling-collar is located, substantially as described.

26. In a firearm, the combination with the frame thereof, of a removable barrel, a magazine connected therewith, a take-up collar mounted upon the barrel, and a sliding non-rotatable coupling-collar also mounted upon the barrel, and provided with a stop-lug which coacts both with a stop upon the frame and with the magazine, to prevent the barrel from being rotated in either direction, substantially as described.

27. In a magazine-firearm, the combination with a frame, of a removable barrel, a rotatable take-up collar mounted thereupon, a non-rotatable sliding coupling-collar also mounted thereupon, a rotatable magazine connected with the barrel at its forward end and adapted at its rear end to enter an opening in the forward end of the frame, two stops located upon the magazine, a sliding handle mounted upon the magazine, and an action-bar extending rearward from the sliding handle and coacting with one of the said stops for preventing the magazine from being rotated in one direction after the gun has been assembled, the other stop coacting with the said take-up collar to prevent the magazine from rotating in the opposite direction after the gun has been assembled, substantially as described.

In testimony whereof I have signed this specification in the presence of two subscribing witnesses.

J. M. BROWNING.

Witnesses:
M. S. BROWNING,
KATE LINEHAN.